(12) United States Patent
Pathak

(10) Patent No.: US 10,180,188 B2
(45) Date of Patent: Jan. 15, 2019

(54) MULTI-MATERIAL SEAL WITH LIP PORTIONS

(71) Applicant: ONESUBSEA IP UK LIMITED, London (GB)

(72) Inventor: Parth Dilip Pathak, Houston, TX (US)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 15/040,831

(22) Filed: Feb. 10, 2016

(65) Prior Publication Data
US 2017/0227128 A1    Aug. 10, 2017

(51) Int. Cl.
*F16J 15/3236* (2016.01)

(52) U.S. Cl.
CPC .................. *F16J 15/3236* (2013.01)

(58) Field of Classification Search
CPC ..... F16J 15/3236; F16J 15/067; F16J 15/3232
See application file for complete search history.

(56) References Cited

U.S. PATENT DOCUMENTS

| | | | | |
|---|---|---|---|---|
| 2,330,425 A * | 9/1943 | Hilton | ...................... | F16L 17/06 220/230 |
| 2,420,929 A | 5/1947 | Buffington et al. | | |
| 2,644,701 A * | 7/1953 | Flick | ..................... | F16J 15/3236 277/550 |
| 3,098,660 A * | 7/1963 | Hausner | ................... | F16J 15/20 277/530 |
| 3,290,047 A * | 12/1966 | Mayer | ....................... | F02K 9/60 277/318 |
| 3,346,265 A | 10/1967 | Rhoads et al. | | |
| 3,678,809 A * | 7/1972 | Doutt | .................... | F04B 53/143 277/436 |
| 3,797,864 A | 3/1974 | Hynes et al. | | |
| 3,915,462 A * | 10/1975 | Bruns | .................. | F16J 15/0887 277/647 |
| 4,178,020 A * | 12/1979 | Dopyera | ............... | F16L 37/002 277/607 |
| 4,521,040 A | 6/1985 | Slyker et al. | | |
| 4,592,558 A * | 6/1986 | Hopkins | .............. | F16J 15/3236 277/530 |
| 4,719,971 A | 1/1988 | Owens | | |
| 5,355,961 A | 10/1994 | Gariepy et al. | | |
| 5,975,589 A * | 11/1999 | Wilkins | ............... | F16J 15/3236 277/322 |
| 5,997,003 A * | 12/1999 | Turner | .................... | E21B 33/04 277/335 |
| 6,045,137 A | 4/2000 | Friend et al. | | |
| 6,843,480 B2 * | 1/2005 | Nelson | ................ | E21B 33/1208 277/338 |
| 6,962,206 B2 | 11/2005 | Hirth et al. | | |
| 7,740,248 B2 | 6/2010 | Keene et al. | | |
| 8,201,832 B2 | 6/2012 | Kocurek | | |
| 8,393,400 B2 | 3/2013 | Buckle | | |

(Continued)

*Primary Examiner* — Eugene G Byrd
(74) *Attorney, Agent, or Firm* — Fletcher Yoder, P.C.

(57) ABSTRACT

A system may include a seal including first and second lip portions and an inner portion disposed between the first and second lip portions. The first and second lip portions may be formed from a different material than the inner portion. Additionally, the first and second lip portions may be configured to block the flow of fluid to the inner portion. Further, the first and second lip portions may be configured to block extrusion of the inner portion.

23 Claims, 8 Drawing Sheets

(56) References Cited

U.S. PATENT DOCUMENTS

| | | |
|---|---|---|
| 8,800,648 B2 | 8/2014 | Kocurek et al. |
| 8,894,070 B2 * | 11/2014 | Bhat .................... E21B 33/1212 |
| | | 277/312 |
| 2003/0209857 A1 | 11/2003 | Keene |
| 2008/0122184 A1 * | 5/2008 | Hocker ................ F02M 59/442 |
| | | 277/366 |
| 2013/0207349 A1 | 8/2013 | Kalinec |
| 2014/0178182 A1 * | 6/2014 | Huth .................... F04D 29/083 |
| | | 415/170.1 |
| 2014/0197599 A1 * | 7/2014 | Nahrwold ............ F16J 15/3236 |
| | | 277/307 |

* cited by examiner

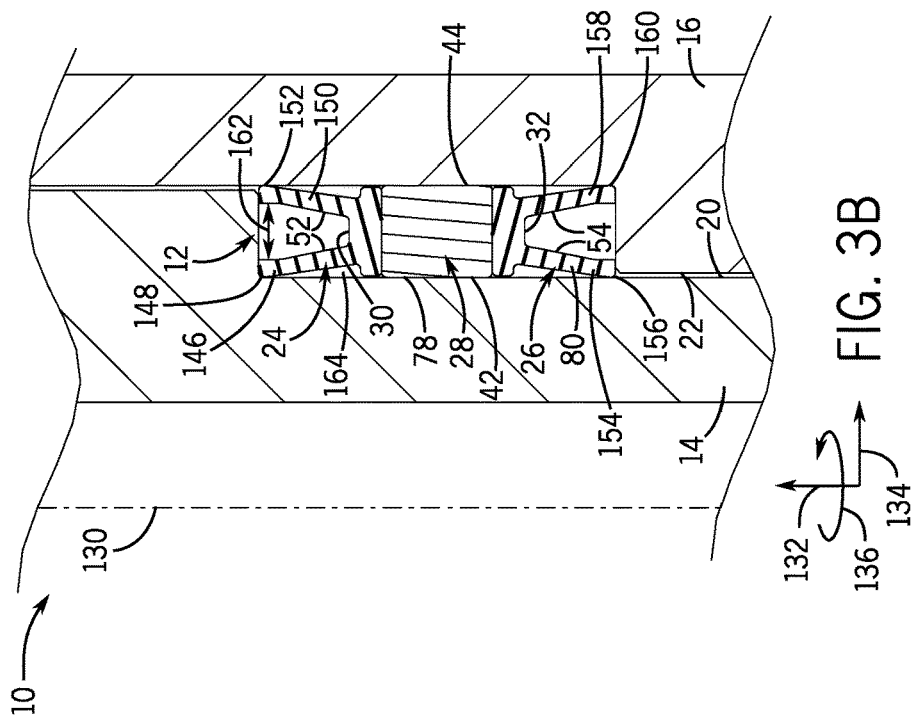
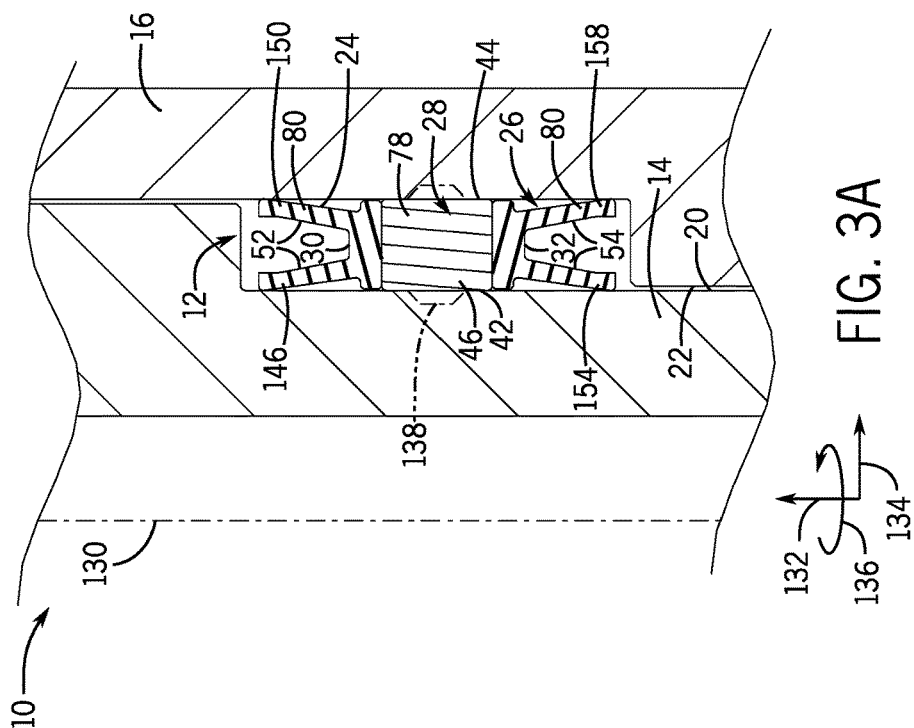

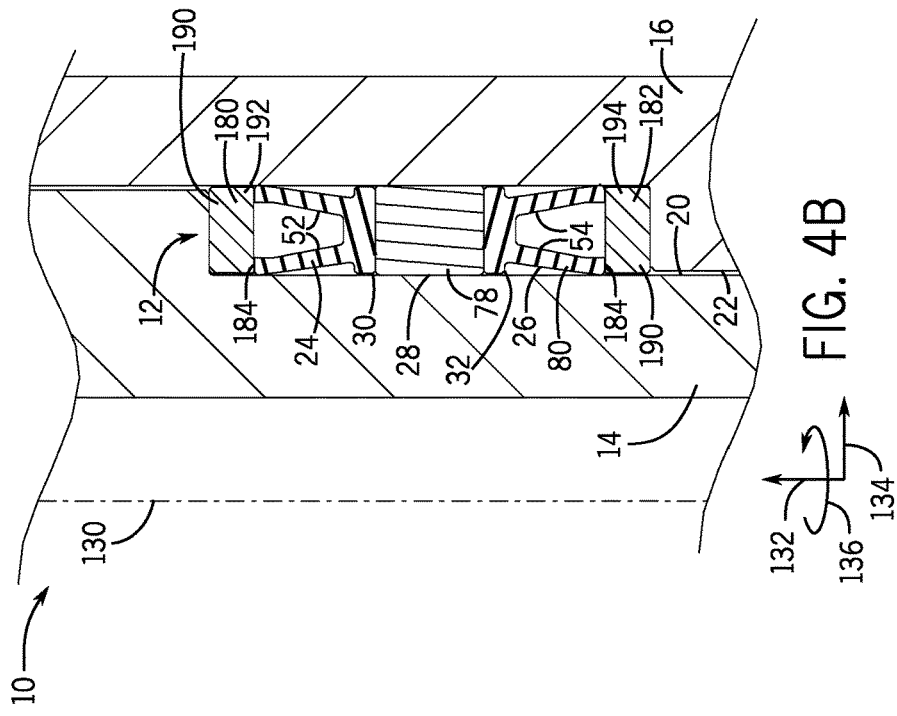
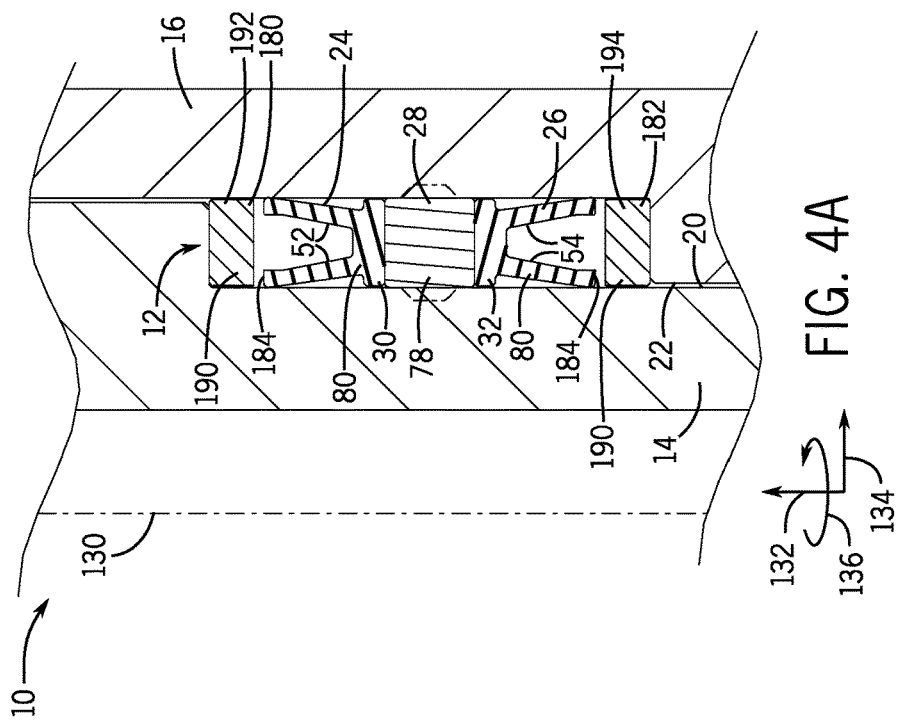

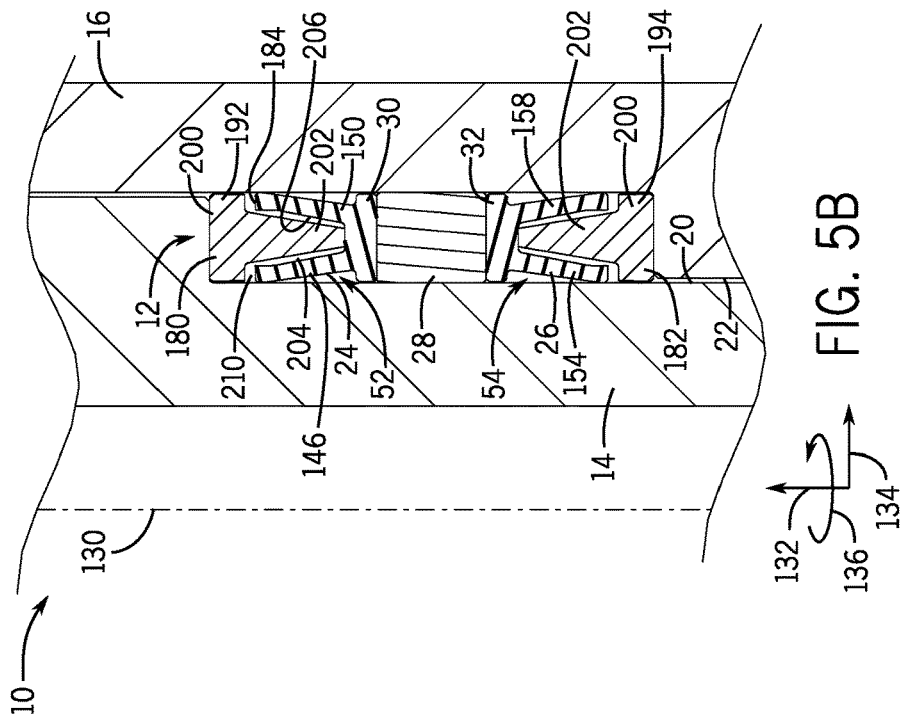
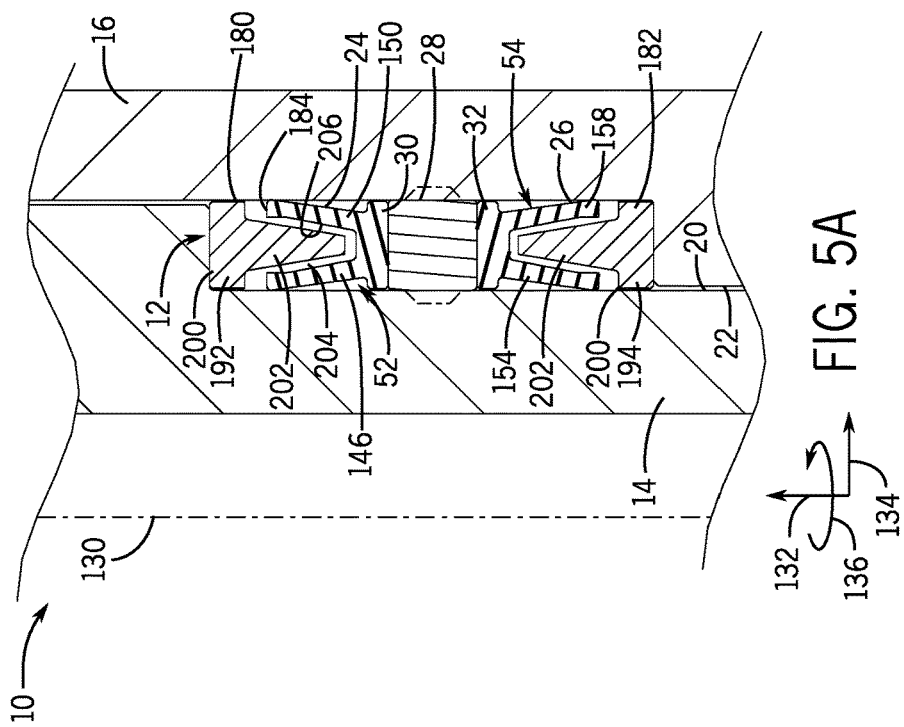

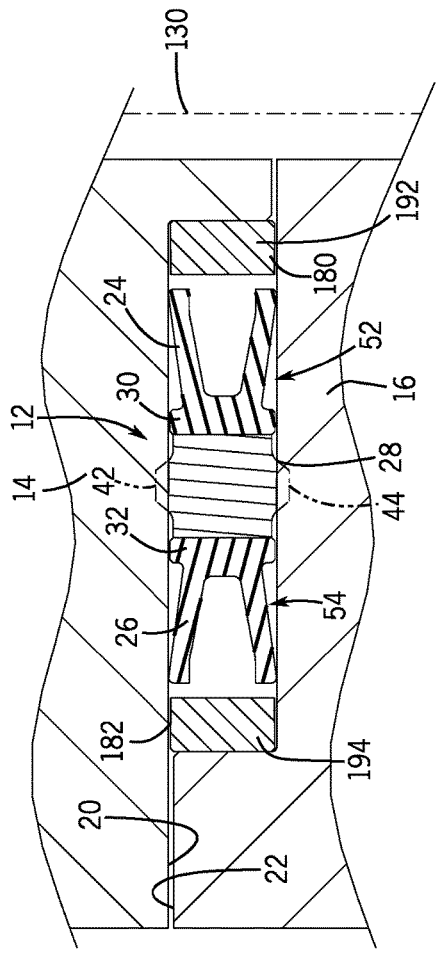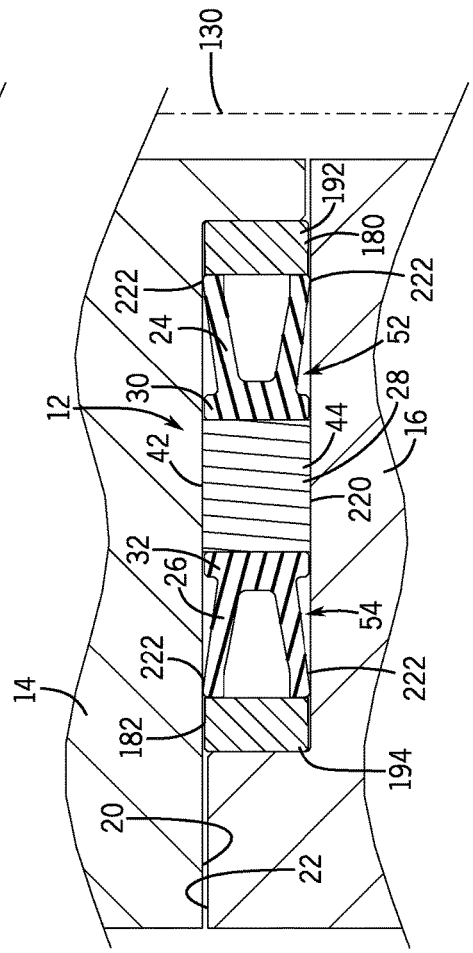

MULTI-MATERIAL SEAL WITH LIP PORTIONS

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Fluid systems, such as mineral (e.g., oil and gas) extraction systems and transport systems, typically include multiple segments of tubing, valves, and connectors that are sealed together by various seals. Seals are often constructed from elastomeric materials or from metal materials. In some fluid systems, these seals may be subjected to harsh environmental conditions, such as exposure to extreme pressures, extreme temperatures, and/or corrosive fluids. Such harsh environmental conditions may decrease the effectiveness of the seals and/or may degrade the seals. Further, seals are often disposed in remote equipment, such as marine (e.g., sub-sea) wellheads, which can make access and repair of the seals difficult and expensive.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIGS. 3A and 3B are cross-sectional views of an annular radial seal including lip seal portions and an inner portion, where FIG. 3A shows the annular radial seal in an initial condition of installation and FIG. 3B shows the annular radial seal in an installed condition, in accordance with an embodiment of the present disclosure;

FIGS. 4A and 4B are cross-sectional views of an annular radial seal including lip seal portions, an inner portion, and back-up rings, where FIG. 4A shows the annular radial seal in an initial condition of installation and FIG. 4B shows the annular radial seal in an installed condition, in accordance with an embodiment of the present disclosure;

FIGS. 5A and 5B are cross-sectional views of an annular radial seal including lip seal portions, an inner portion, and protruding back-up rings, where FIG. 5A shows the annular radial seal in an initial condition of installation and FIG. 5B shows the annular radial seal in an installed condition, in accordance with an embodiment of the present disclosure;

FIGS. 6A and 6B are cross-sectional views of an annular face seal including lip seal portions, an inner portion, and back-up rings, where FIG. 6A shows the annular face seal in an initial condition of installation and FIG. 6B shows the annular face seal in an installed condition, in accordance with an embodiment of the present disclosure;

DETAILED DESCRIPTION

Figure 1:
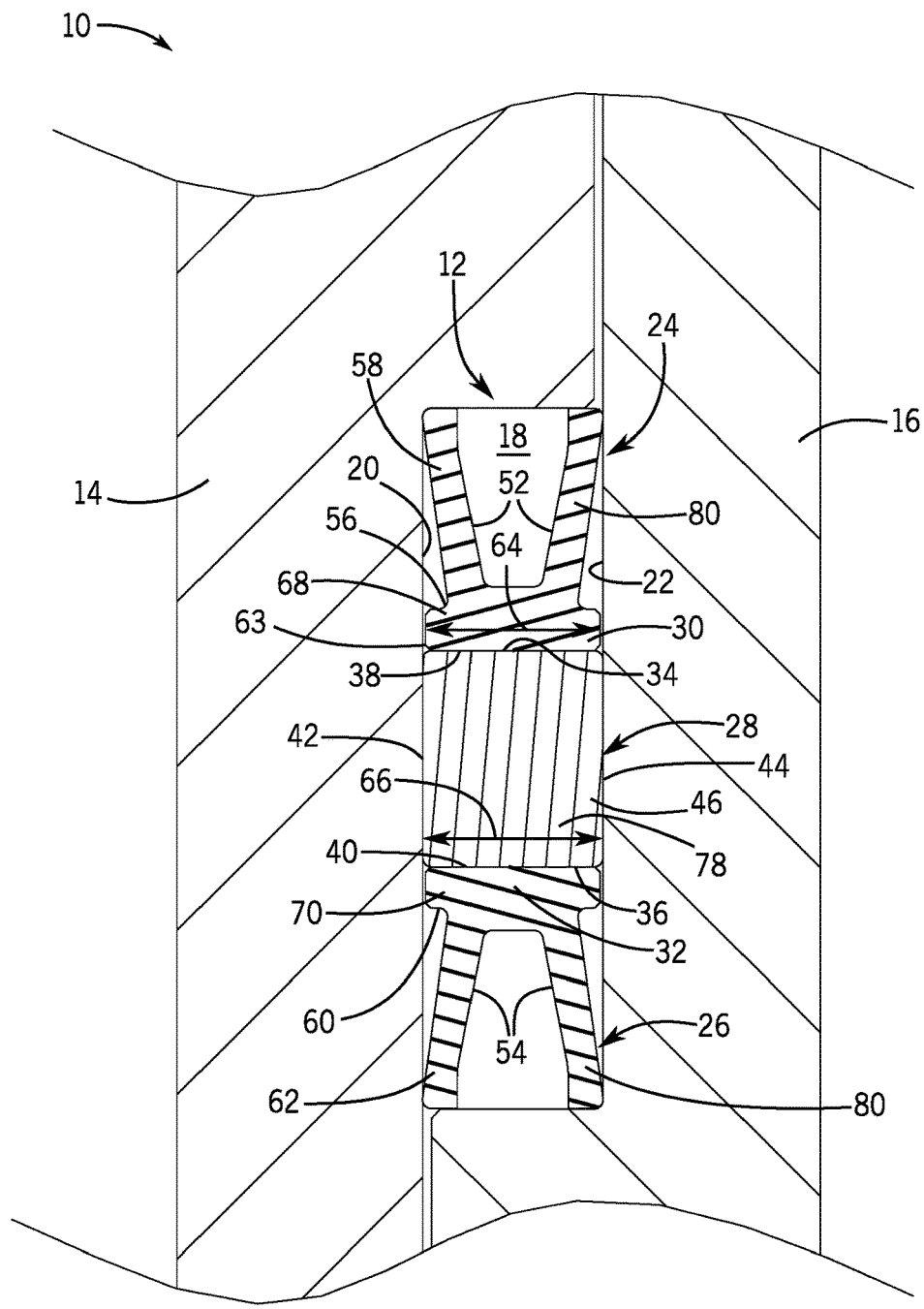
FIG. 1 is a partial cross-sectional view of a fluid system including a seal having a first lip seal portion, a second lip seal portion, and an inner portion, in accordance with an embodiment of the present disclosure.

One or more specific embodiments of the present disclosure will be described below. These described embodiments are only exemplary of the present disclosure. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of the present disclosure, the articles "a," "an," and "the" are intended to mean that there are one or more of the elements. The terms "comprising," "including," and "having" are used in an open-ended fashion, and thus should be interpreted to mean "including, but not limited to . . . ." Any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," "upper," "lower," "up," "down," "vertical," "horizontal," "first,"

"second," "inner," "outer," and variations of these terms is made for convenience but does not require or imply any particular orientation, number, or prominence of these components.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

Fluid systems, such as mineral (e.g., oil, gas, and/or hydrocarbon) extraction systems and transport systems, may include a variety of components, such as pipes, valves, and connectors, that are sealed together using seals. The seals may be formed from an elastomer, a metal, or from an elastomeric core in combination with metal end caps, for example. Elastomeric seals may have a simple design that is easy to manufacture and that can be installed with low installation forces. Additionally, elastomeric seals may provide a seal across imperfections (e.g., damage, defects, etc.) on sealing surfaces. However, in some fluid systems, the seals may be exposed to harsh environmental conditions, such as extreme (e.g., high and/or low) pressures, extreme temperatures, and/or corrosive fluids. Such harsh environmental conditions may increase the possibility of damage and/or decrease the effectiveness of the elastomeric seals. For example, exposure to corrosive fluids may degrade the elastomeric seals. Additionally, when an elastomeric seal is exposed to high pressures, particularly at high temperatures, the elastomeric seal may extrude into the clearance gap. Further, when an elastomeric seal is exposed to high pressure gas at high temperatures, for example, gases may diffuse into the elastomeric seal. The gases may expand and diffuse out of the elastomeric seal when the system is depressurized. However, if the rate of decompression and expansion is high, explosive decompression (also referred to as rapid gas decompression) may occur, in which event the gases trapped within the elastomeric seal cause fissuring and seal failure. Metal seals, while of higher strength, require higher installation forces.

As discussed in detail below, present embodiments are directed to a seal (e.g., an annular seal) including an inner portion (e.g., an annular inner portion, an inner ring, etc.) and outer lip portions (e.g., annular outer lip portions, outer lip rings, etc.) disposed about opposite ends of the inner portion. The outer lip portions may be configured to provide the primary sealing, while the inner portion may be configured to provide secondary sealing. That is, when the seal is exposed to fluid pressure, the outer lip portions may reduce or block fluid flow to the inner portion such that fluid exposure to the inner portion is reduced or blocked. In this manner, the inner portion may be exposed to fluid pressure only in the event of seal failure of one of the outer lip portions.

Further, as discussed below, the inner portion and the outer lip portions may be made of different materials having different characteristics, such as hardness, stiffness, chemical resistance, gas permeability, behavior as a function of temperature, and so forth. For example, the inner portion may be formed from a resilient material, such as an elastomer. Additionally, the outer lip portions may be formed from a robust (e.g., high strength) material, such as a metal. In particular, the outer lip portions may be formed of a material that is more robust (e.g., less susceptible to adverse effects) than the resilient material when exposed to harsh conditions, such as extreme (e.g., high and/or low) pressures, extreme temperatures, and/or corrosive fluids. As such, the outer lip portions, which reduce or block fluid exposure to the inner portion, may increase the effectiveness of the seal and may reduce the possibility of damage to the seal when the seal is exposed to environmental conditions, such as extreme temperatures, extreme pressures, and/or corrosive fluids.

FIG. 1 is a partial cross-sectional view of an embodiment of a fluid system 10 of the present disclosure including a seal 12 (e.g., an annular seal, a seal assembly, etc.) disposed (e.g., installed) between a first body 14 (e.g., a first component, a first annular body, an inner body, an upper body, etc.) and a second body 16 (e.g., a second component, a second annular body, an outer body, a lower body, etc.). In certain embodiments, the fluid system 10 may be a mineral extraction system configured to extract subterranean natural resources, such as oil and gas. The fluid system 10 may be configured to handle a variety of fluids (e.g., liquids and/or gases), such as production fluids (e.g., oil and/or gas), process fluids, corrosive fluids (e.g., fluids used in hydraulic fracturing operations (fracking fluids) and/or chemical fluids), and so forth. In some embodiments, the operating environment of the fluid system 10 may include extreme (e.g., high and/or low) pressures and/or temperatures. For example, in some embodiments, the seal 12 may be used to isolate regions of gases or other fluids with pressure differentials across the seal 12 of 30 megapascals (MPa), 70 MPa, 100 MPa, or greater. Further, in some embodiments, the seal 12 may be exposed to temperatures ranging from −45 degrees Celsius (° C.) to +210° C., for example.

As illustrated, the seal 12 is disposed in a seal gland 18 (e.g., annular channel), which may be formed in a first surface 20 (e.g., a sealing surface) of the first body 14 and/or a second surface 22 (e.g., a sealing surface) of the second body 16. In some embodiments, the seal 12 (e.g., an annular radial seal) may be configured to provide radial sealing between the first and second surfaces 20 and 22, which may be annular or curved surfaces. In certain embodiments, the seal 12 (e.g., an annular face seal) may be configured to provide face sealing between the first and second surfaces 20 and 22, which may be planar (e.g., flat) surfaces. It should be noted that while the illustrated embodiment of the fluid system 10 includes one seal 12, the fluid system 10 may be include any number of seals 12, such as two, three, four, five, six, seven, eight, nine, ten, or more. Further, in embodiments in which the fluid system 10 includes two or more seals 12, the two or more seals 12 may be the same type (e.g., both annular radial seals) or different types (e.g., an annular radial seal and an annular face seal).

The seal 12 includes first and second lip portions 24 and 26 (e.g., annular lip portions, lip rings, annular lip seals, etc.) and an inner portion 28 (e.g., annular inner portion, inner ring, annular inner seal, etc.) disposed between the first and second lip portions 24 and 26. In some embodiments, the inner portion 28 may be disposed between a first base 30 (e.g., annular base) of the first lip portion 24 and a second base 32 (e.g., annular base) of the second lip portion 26. For example, the inner portion 28 may include a first outer surface 34 (e.g., a non-sealing surface) and a second outer surface 36 (e.g., a non-sealing surface) opposite from the first outer surface 34. At least a portion of the first outer surface 34 may be disposed adjacent to (e.g., abut or directly contact) at least a portion of a first inner surface 38 of the first base 30. Additionally, at least a portion of the second outer surface 36 may be disposed adjacent to (e.g., abut or directly contact) at least a portion of a second inner surface 40 of the second base 32. In some embodiments, the entire first outer surface 34 and/or the entire second outer surface 36 may abut the first inner surface 38 and/or the second inner surface 40, respectively.

In some embodiments, the inner portion 28 may be coupled to the first lip portion 24 and the second lip portion 26. For example, it may be desirable to couple the inner portion 28 to the first lip portion 24 and the second lip portion 26 when the seal 12 is used in dynamic applications. The inner portion 28 may be coupled to the first and second lip portions 24 and 26 mechanically, chemically, adhesively, thermally, or by any other means. In certain embodiments, the inner portion 28 may be adhesively coupled or bonded to the first base 30 of the first lip portion 34 and the second base 32 of the second lip portion 26. For example, the abutting portions of the first outer surface 34 and the first inner surface 38 may be bonded together using an adhesive, and the abutting portions of the second outer surface 36 and the second inner surface 40 may be bonded together using an adhesive. In some embodiments, the inner portion 28 may be mechanically coupled to the first lip portion 24 and the second lip portion 26. For example, the inner portion 28 may be mechanically coupled to the first lip portion 24 and the second lip portion 26 via male and female joints, dovetail joints, rods, tubes, threaded fasteners, bolts, screws, and so forth. In some embodiments, the inner portion 28 may not be coupled to the first lip portion 24 and the second lip portion 26. For example, in static applications, the first lip portion 24, the second lip portion 26, and the inner portion 28 may be assembled (e.g., sandwiched, placed, etc.) together to form the seal 12.

The inner portion 28 also includes a first sealing surface 42 and a second sealing surface 44 opposite from the first sealing surface 42. The first sealing surface 42 may abut (e.g., contact) and/or form a seal (e.g., a sealing interface) with the first surface 20 of the first body 14. Additionally, the second sealing surface 44 may abut (e.g., contact) and/or form a seal (e.g., a sealing interface) with the second surface 22 of the second body 16. It should be appreciated that while a cross-section 46 of the inner portion 28 is generally rectangular in the illustrated embodiment, the cross-section 46 of the inner portion 28 may have any suitable geometry or shape, such as a square, a circle, an oval, an irregular shape, and so forth. Additionally, it should be noted that the first outer surface 34, the second outer surface 36, the first sealing surface 42, and/or the second sealing surface 44 may include portions that are curved, flat, tapered, grooved (e.g., including bumps, protrusions, indentations, recesses, or similar features), or any combination thereof. In certain embodiments, each structure, surface, and material shown in FIG. 1 may extend circumferentially about an axis, and thus may have a generally curved shape (e.g., annular). In other words, the illustrated cross-section may be taken through an annular seal 12 with annular lip portions 24 and 26 and an annular inner portion 28. In some embodiments, the illustrated cross-section may extend in a linear direction. In certain embodiments, the illustrated cross-section may form a loop of any suitable shape, such as an oval, a rectangle, a square, and so forth.

As noted above, the first and second lip portions 24 and 26 include the first base 30 and the second base 32, respectively, that may be disposed adjacent to the inner portion 28. Additionally, the first lip portion 24 includes a first pair of legs 52 (e.g., annular legs) that extend away from the first base 30, and the second lip portion 26 includes a second pair of legs 54 (e.g., annular legs) that extend away from the second base 32. The first pair of legs 52 are joined with (e.g., coupled to, integral with, etc.) a first outer surface 56 of the first base 30 such that a cross-section 58 of the first lip portion 24 is generally V-shaped, U-shaped, or arcuate. Similarly, the second pair of legs 54 are joined with (e.g., coupled to, integral with, etc.) a second outer surface 60 of the second base 32 such that a cross-section 62 of the second lip portion 26 is generally V-shaped, U-shaped, or arcuate. In some embodiments, the first and second lip portions 24 and 26 may have the same or similar dimensions. For example, the cross-section 58 of the first lip portion 24 and the cross-section 62 of the second lip portion 26 may generally match or mirror each other (e.g., within manufacturing tolerances). In certain embodiments, the shapes and/or one or more dimensions of the first lip portion 24 and the second lip portion 26 may differ.

As illustrated, the first pair of legs 52 and the second pair of legs 54 may extend away from each other and away from the inner portion 28 of the seal 12. As such, the first and second lip portions 24 and 26 may be referred to as outward facing lip portions or outward extending lip portions. Further, the first and second lip portions 24 and 26 may be inverted relative to seal end caps (e.g., metal end caps), which are generally curved to partially enclose an inner seal portion (e.g., an inner elastomer portion). As such, the first and second lip portions 24 and 26 may be referred to as inverted lip portions.

As discussed in more detail below with respect to FIGS. 3 and 4, the first pair of legs 52 and the second pair of legs 54 may form seals (e.g., seal interfaces) with the first body 14 and the second body 16. For example, when the first lip portion 24 is exposed to fluid pressure, the fluid pressure may create an outwardly biasing force that biases the legs of the first pair of legs 52 away from one another, and the first pair of legs 52 may contact and seal against the first body 14 and the second body 16 by virtue of geometric interference. Similarly, when the second lip portion 26 is exposed to fluid pressure, the fluid pressure may create an outwardly biasing force that biases the legs of the second pair of legs 54 away from each other. The outwardly biasing force may cause the second pair of legs 54 to contact and seal against the first body 14 and the second body 16. Thus, the seal 12 may be a bi-directional seal (e.g., a dual-directional seal) that is configured to provide a seal when exposed to fluid pressure from either end of the seal 12.

The first and second lip portions 24 and 26 may be configured to provide the primary seal of the seal 12, while the inner portion 28 may be configured to provide the secondary seal of the seal 12. That is, the first and second lip portions 24 and 26 may be directly exposed to a fluid within the seal gland 18 and may reduce or block flow of the fluid to the inner portion 28. In this manner, the inner portion 28 may be exposed to fluid (e.g., fluid pressure), or fluid pressure exceeding a desired amount, only in the event of seal failure of, or some leakage past, the first and/or second lip portions 24 and 26. For example, in some embodiments, when the first lip portion 24 and/or the second lip portion 26 provides the primary seal, the first lip portion 24 and/or the second lip portion 26 may reduce or block flow of the fluid to the inner portion 28 such that the inner portion 28 is exposed to a negligible or small (e.g., less than a maximum threshold) of fluid and/or fluid pressure.

In some embodiments, the first base 30 of the first lip portion 24 and the second base 32 of the second lip portion 26 may be configured to reduce or block fluid flow to the inner portion 28. For example, the first base 30 and the second base 32 may be sized and/or shaped to reduce or minimize a clearance gap between an outer surface 63 of the respective base and the respective surface (e.g., the first surface 20 or the second surface 22) of the first and second bodies 14 and 16. For example, in some embodiments, a width 64 (e.g., a maximum width) of each base 30 and 32 may be between 90% and 100%, 91% and 99%, 92% and 98%, or 93% and 97% of a width 66 of the seal gland 18. In certain embodiments, the width 64 of each base 30 and 32 may be at least 90%, 95%, or 97% of the width 66 of the seal gland 18 (e.g., the distance between the first surface 20 and the second surface 22 in the seal gland 18). In some embodiments, the width 64 of each base 30 and 32 may be approximately equal to (e.g., within about one, two, three, four, or five percent) of the width 66 of the seal gland 18.

It should be appreciated that while a cross-section 68 of the first base 30 and a cross-section 70 of the second base 32 are generally rectangular in the illustrated embodiment, the cross-sections 68 and 70 may include any suitable geometry or shape such that the first and second bases 30 and 32 reduce or block fluid flow to the inner portion 28 (e.g., the width 64 is at least 90% of the width 66 of the seal gland 18). For example, the cross-sections 68 and 70 may include a square, an oval, a circle, a triangle, a trapezoid, an irregular shape, and so forth. Further, the cross-sections 68 and 70 may include portions that are curved, flat, tapered, grooved (e.g., including bumps, protrusions, indentations, recesses, or similar features), or any combination thereof. For example, the first and second inner surfaces 38 and 40 of the first and second bases 30 and 32, respectively, may be generally planar (e.g., flat), as illustrated, or may include portions that are curved and/or grooved (e.g., including bumps, protrusions, indentations, recesses, or similar features). Additionally, it should be appreciated that cross-section 68 of the first base 30 and the cross-section 70 of the second base 32 may be the same, generally similar (e.g., generally matched or mirrored), or different.

By reducing or minimizing the clearance gaps, the first base 30 and the second base 32 may reduce or block the flow of fluid around the first base 30 and the second base 32 to the inner portion 28. Additionally, by reducing or minimizing the clearance gaps, the first base 30 and the second base 32 may reduce or block extrusion of the inner portion 28 (e.g., deformation of the inner portion 28 into the clearance gaps). That is, the first base 30 and the second base 32 may reduce or block extrusion or deformation of the inner portion 28 around the outer surfaces of the first base 30 and the second base 32. In some embodiments, the first base 30 and the second base 32 may block the inner portion 28 from deforming, extruding, and/or extending past the inner surfaces 38 and 40 of the first and second bases 30 and 32, respectively, and toward the first and second pairs of legs 52 and 54. Further, the first base 30 and the second base 32 may reduce or minimize damage to the inner portion 28 should extrusion of the inner portion 28 otherwise occur. As such, the first and second lip portions 24 and 26 may reduce or minimize the possibility of extrusion of the inner portion 28 and/or may reduce or minimize damage to the inner portion 28 in the event of extrusion, which may increase the sealing ability, reliability, and/or lifetime of the seal 12.

Additionally, the inner portion 28 may be made from a different material than the first and second lip portions 24 and 26. For example, the inner portion 28 may be made from a first material 78 (e.g., a resilient material), and the first and second lip portions 24 and 26 may be made from a second material 80 (e.g., a robust material) that is different from the first material 78. In some embodiments, the first material 78 may include one or more elastomeric materials (e.g., elastomers), such as natural rubber, synthetic rubber, nitrile rubber, silicone rubber, polyisoprene, polybutadiene, ethylene propylene rubber, fluoroelastomer, or any combination thereof. In certain embodiments, the first material 78 may include an elastomer having a Durometer between 60 Shore A and 100 Shore A.

In certain embodiments, the second material 80 may include one or more metallic materials (e.g., metals or metal alloys), such as steel, stainless steel, nickel, chromium, iron, titanium, tungsten, platinum, zinc, cadmium, a steel-based alloy, and/or a nickel-based alloy (e.g., a nickel-iron alloy, a nickel-titanium alloy, etc.). Additionally or alternatively, the second material 80 may include one or more thermoplastic polymers (e.g., polyether ether ketone (PEEK), polytetrafluoroethylene (PTFE), etc.) and/or one or more plastics (e.g., high temperature plastics). In some embodiments, the second material 80 may be corrosion resistant. For example, the second material 80 may include one or more corrosion resistant alloys, such as nickel alloys and/or stainless steel alloys (e.g., stainless steel alloys including chromium). In certain embodiments, the second material 80 may include a corrosion resistant coating (e.g., polyurethane, a galvanized coating, etc.). Further, as discussed in more detail below, the second material 80 may be configured to elastically (e.g., reversibly) deform. For example, in some embodiments, the elastic modulus of the second material 80 (e.g., a thermoplastic polymer) may be between approximately 0.4 gigpascals (GPa) and approximately five GPa. In some embodiments, the elastic modulus of the second material 80 (e.g., a metal or metal alloy) may be between approximately 100 and 250 GPa.

The first material 78 and the second material 80 may have one or more different material characteristics, such as hardness, stiffness (e.g., elastic modulus), strength (e.g., tensile strength and/or compressive strength), chemical resistance, gas permeability, coefficient of thermal expansion, and so forth. In some embodiments, the second material 80 may be significantly harder than the first material 78. For example, in some embodiments, the second material 80 may be at least two, three, four, five, ten, 25, 50, 100, or 500 times harder (e.g., more resistant to permanent indentations) than the first material 78. As such, the first and second lip portions 24 and 26 may be less susceptible to damage than the inner portion 28 when exposed to abrasive fluids (e.g., particulate-laden fluids, fracking fluids, etc.). Accordingly, the first and second lip portions 24 and 26, which reduce or block fluid flow to the inner portion 28, may reduce or minimize damage to the seal 12 as compared to seals that do not include the first and second lip portions 24 and 26.

In some embodiments, the second material 80 may be more resistant to corrosive fluids (e.g., fracking fluids, chemical fluids, etc.) than the first material 78. For example, in some embodiments, the second material 80 may be at least 1.1, 1.2, 1.3, 1.4, 1.5, two, three, four, five, ten, or 15 times more corrosion resistant than the first material 78. In some embodiments, the second material 80 may be between one and 25 times, three and 20 times, five and 15 times, or seven and ten times more corrosion resistant than the first material 78. Thus, the first and second lip portions 24 and 26 may reduce or minimize damage to the seal 12 caused by exposure to corrosive fluids as compared to seals that do not include the first and second lip portions 24 and 26.

Further, in some embodiments, the second material 80 may have a coefficient of thermal expansion that is less than a coefficient of thermal expansion of the first material 78. For example, in certain embodiments, the coefficient of thermal expansion of the second material 80 may be between approximately 5% and 95%, 10% and 90%, 20% and 85%, 30% and 80%, or 40% and 75% of the coefficient of thermal expansion of the first material 78. In some embodiments, the coefficient of thermal expansion of the second material 80 may be less than 90%, 80%, 70%, 60%, or 50% of the coefficient of thermal expansion of the first material 78. Because the second material 80 has a lower coefficient of thermal expansion than the first material 78, the first and second lip portions 24 and 26 may contract and expand to a lesser degree than the inner portion 28 when the seal 12 is exposed to low temperatures and high temperatures, respectively. As such, the first and second lip portions 24 and 26 may increase the reliability and robustness of the seal 12 in extreme (e.g., high and/or low) temperatures.

Additionally, in some embodiments, the second material 80 may be less permeable to gases (e.g., more resistant to gas diffusion) than the first material 78. That is, the second material 80 may have a lower gas permeability and/or a lower gas diffusion rate than the first material 78. For example, in some embodiments, the gas permeability of the second material 80 may be between approximately 1% and 90%, 5% and 80%, 10% and 70%, or 20% and 50% of the gas permeability of the first material 78. In certain embodiments, the gas permeability of the second material 80 may be less than 75%, 50%, or 25% of the gas permeability of the first material 78. In some embodiments, the second material 80 may have a gas diffusion rate that is between approximately 1% to 90%, 5% to 80%, 10% to 70%, 15% to 60%, or 20% to 50%, or less than 50%, of the gas diffusion rate of the first material 78. In some embodiments, the second material 80 may be at least 1.1, 1.2, 1.3, 1.4, 1.5, two, three, four, five, or more times more resistant to gas diffusion than the first material 78, for example. In some embodiments, the second material 80 may block or prevent gas diffusion such that no gas molecules or a negligible amount of gas molecules may diffuse into the second material 80.

Thus, the second material 80 may reduce, block, or prevent gas diffusion into the first and second lip portions 24 and 26. Additionally, the first and second lip portions 24 and 26, which reduce or block fluid flow to the inner portion 28, may reduce, block, or prevent gas diffusion into the inner portion 28. As a result, the first and second lip portions 24 and 26 may reduce, block or prevent gas diffusion into the seal 12, which may reduce the possibility of explosive gas decompression of the seal 12 and/or may reduce or minimize damage to the seal 12 in the event that explosive gas decompression occurs. Explosive gas decompression of the seal 12 may, in certain conditions, occur when gases diffuse or permeate into the seal 12. In particular, at high pressure, gases may diffuse into the seal 12 in a compressed state. When the pressure is rapidly reduced, the compressed gases in the seal 12 may rapidly expand. The rapidly expanding gases may cause cracks and/or fissures to form in the seal 12, which may damage the seal 12, reduce the sealing ability and/or reliability of the seal 12, and/or reduce the lifetime of the seal 12. Accordingly, the first and second lip portions 24 and 26 may reduce or minimize damage to the seal 12 in the event that explosive gas decompression occurs, may increase the reliability and robustness of the seal 12, and may increase the lifespan of the seal 12.

Figure 2:
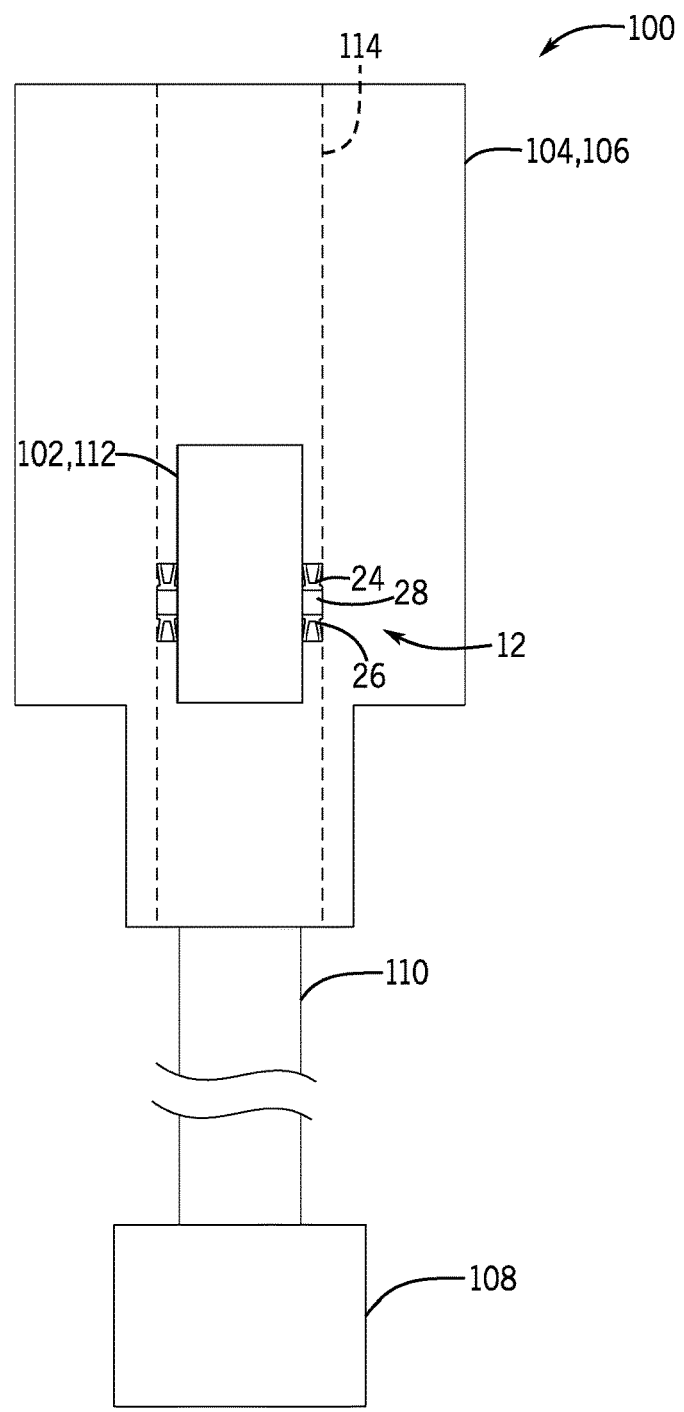
FIG. 2 is a cross-sectional view of a mineral extraction system including a seal having a first lip seal portion, a second lip seal portion, and an inner portion, in accordance with an embodiment of the present disclosure.

FIG. 2 illustrates a cross-sectional view of an embodiment a mineral extraction system 100 including the seal 12 having the first lip portion 24, the second lip portion 26, and the inner portion 28. As illustrated, the seal 12 is disposed between an inner body 102 and an outer body 104. In some embodiments, the seal 12 may be curved (e.g., annular, oval, etc.). The mineral extraction system 100 may be configured to extract subterranean natural resources, such as oil and gas. In some embodiments, the outer body 104 may include a wellhead 106 coupled to a mineral deposit 108 via a well 110. Additionally, in certain embodiments, the inner body 102 includes a hanger 112 (e.g., tubing hanger, casing hanger, etc.) disposed in a wellhead bore 114 and supported by the wellhead 106. The inner and outer bodies 102 and 104 may include any number of components, such as Christmas trees, spools, casing hangers, casing heads, casing strings, tubing hangers, tubing heads, tubing strings, running tools, blowout preventers, valves, flanges, and the like. Further, in mineral extraction systems 100 and other fluid systems 10, the seal 12 may be used with working pressures that are 140 MPa or greater. In other words, in certain embodiments, the seal 12 may be used to isolate regions of gases or other fluids with pressure differentials across the seal 12 of 30 MPa, 70 MPa, 100 MPa, or greater. Further, the operating environment of the mineral extraction system 100 may include temperatures ranging from −45° C. to +210° C., for example.

FIGS. 3A and 3B illustrate cross-sectional views of an embodiment of the fluid system 10 including an annular radial seal 12 disposed between the first body 14 and the second body 16. In particular, as discussed below, FIG. 3A shows the annular radial seal 12 in an initial condition of installation between the first body 14 and the second body 16, and FIG. 3B shows the annular radial seal 12 in an installed (e.g., sealed) condition between the first body 14 and the second body 16. The annular radial seal 12 includes an annular first lip portion 24 (e.g., lip ring), an annular second lip portion 26 (e.g., lip ring), an annular inner portion 28 (e.g., inner ring), and a longitudinal axis 130. As will be appreciated, the annular first lip portion 24, the annular second lip portion 26, and the annular inner portion 28 are generally ring-shaped and centered about the longitudinal axis 130. As discussed above, the annular inner portion 28 is formed from the first material 78, and the first and second annular lip portions 24 and 26 are formed from the second material 80.

In the following discussion, reference may be made to various directions or axes, such as an axial direction 132 that extends along the longitudinal axis 130, a radial direction 134 that extends away from the longitudinal axis 130, and a circumferential direction 136 that extends around the longitudinal axis 130. As discussed below, the annular radial seal 12 is configured to provide radial 134 seals (e.g., sealing in the radial direction 134, circumferentially 136 about the axis 132) between the first body 14 (e.g., an inner body, an inner component, a mandrel, etc.) and the second body 16 (an outer body, an outer component, a housing, etc.) when the annular radial seal 12 is installed. As will be appreciated, the first body 14 and the second body 16 are annular and centered about the longitudinal axis 130.

The annular inner portion 28 is generally installed by an axial 132 and/or a radial 134 load that elastically deforms (e.g., compresses and/or expands) the first and second sealing surfaces 42 and 44 of the annular inner portion 28 into contact with the first surface 20 of the first body 14 and the second surface 22 of the second body 16, respectively. For example, when the annular inner portion 28 is installed into the first body 14, the annular inner portion 28 may be axially 132 stretched (e.g., outwardly biased in the axial direction 132). Additionally, when the annular inner portion 28 is installed into the second body 16, the annular inner portion 28 may be radially 134 compressed. For example, in some embodiments, the annular inner portion 28 may include a bulging or protruding center portion 138 that may be radially 134 compressed when the annular inner portion 28 is installed. The axial 132 stretch and radial 134 compression of the annular inner portion 28 may force the first sealing surface 42 and the second sealing surface 44 against the first body 14 and the second body 16, respectively, creating a radial seal between the respective interfaces.

As noted above, the cross-section 46 of the annular inner portion 28 may be any suitable geometry or shape. For example, the cross-section 46 may be generally shaped as a rectangular, a square, a circle, an oval, an irregular shape, and so forth. Additionally, the first outer surface 34, the second outer surface 36, the first sealing surface 42, and/or the second sealing surface 44 may include portions that are curved, flat, tapered, grooved (e.g., including bumps, protrusions, indentations, recesses, or similar features), or any combination thereof. For example, in some embodiments, the first and second sealing surfaces 42 and 44 may include one or more grooves (e.g., annular grooves) to increase the contact pressure between the first and second sealing surfaces 42 and 44 and the first and second bodies 14 and 16, respectively.

The first annular lip portion 24 is generally installed by an axial 132 and/or radial 134 load that elastically deforms (e.g., compresses) the legs of the first pair of legs 52 of the first annular lip portion 24 toward each other and into contact with the first surface 20 of the first body 14 and the second surface 22 of the second body 16, respectively. For example, the first body 14 may provide a radial 134 compressive load that inwardly biases an inner annular leg 146 (e.g., an inner diameter portion) of the first pair of legs 52, causing the inner annular leg 146 to elastically bend and form an annular radial seal 148 (e.g., an annular radial seal interface) with the first body 14. Additionally, the radial 134 compressive loading may inwardly bias an outer annular leg 150 (e.g., an outer diameter portion) of the first pair of legs 52, causing the outer annular leg 150 to elastically bend to form an annular radial seal 152 with the second body 16. Similarly, the second annular lip portion 26 is generally installed by a radial 134 load that compresses the second pair of legs 54 of the second annular lip portion 26 away from each other and into contact with the first surface 20 of the first body 14 and the second surface 22 of the second body 16, respectively. For example, an inner annular leg 154 of the second pair of legs 54 may elastically bend to form an annular radial seal 156 with the first body 14, and an outer annular leg 158 of the second pair of legs 54 may elastically bend to form an annular radial seal 160 with the second body 16.

Additionally, the first annular lip portion 24 and/or the second annular lip portion 26 may be exposed to fluid pressure that may outwardly bias the first pair of legs 52 or the second pair of legs 54, respectively. For example, when the first annular lip portion 24 is exposed to fluid pressure, the fluid pressure may provide an outwardly biasing force, represented by arrows 162, against the inner annular leg 146 and the outer annular leg 150. The outwardly biasing force 162 may cause the inner annular leg 146 and the outer annular leg 150 to flex apart and may force the inner and outer annular legs 146 and 150 against the first body 14 and the second body 16, respectively. As such, the outwardly biasing force 162 may aid and/or increase the robustness of the annular radial seals 148 and 152. While the above discussion relates to the first annular lip portion 24, it should be appreciated that the second annular lip portion 26 may be similarly biased when exposed to fluid pressure, which may aid and/or increase the robustness of the annular radial seals 156 and 160.

As noted above, the second material 80 of the first and second annular lip portions 24 and 26 is configured to elastically (e.g., reversibly) deform. That is, the first and second annular lip portions 24 and 26 may elastically bend in response to applied forces (e.g., the outwardly biasing force 162), and when the forces are removed, the first and second annular lip portions 24 and 26 may return to their respective original shapes. Thus, the first and second annular lip portions 24 and 26 may return to their respective original shapes when fluid pressure (e.g., the outwardly biasing force 162) is removed and when the first and/or second annular lip portions 24 and 26 are uninstalled from the first and second bodies 14 and 16. As such, the first and second annular lip portions 24 and 26 may be reused and reinstalled between the first and second bodies 14 and 16, or installed between any other suitable components.

As will be appreciated, the first and second annular lip portions 24 and 26 are able to seal only when the respective legs are forced against the first and second bodies 14 and 16. For example, the first and second annular lip portions 24 and 26 may form a seal (e.g., an annular, radial seal) in response to fluid pressure that provides the outwardly biasing force 162, and the first and second annular lip portions 24 and 26 may fail to provide the seal if an inward compressive force is applied to the first and second annular lip portions 24 and 26. That is, in the event that fluid pressure builds up in a cavity (e.g., an annular cavity) 164 between a leg (e.g., the inner annular leg 146, the outer annular leg 150, the inner annular leg 154, and/or the outer annular leg 158) and a corresponding sealing surface (e.g., the first surface 20 of the first body 14 and/or the second surface 22 of the second body 16), the fluid pressure in the cavity 164 may provide an inward compressive force (e.g., inwardly biasing force) on the respective leg. This inwardly biasing force may urge the leg toward the corresponding other leg of the pair of legs, causing the leg to lose contact with the corresponding sealing surface. That is, the inwardly biasing force may elastically deform the inner annular leg 146, the outer annular leg 150, the inner annular leg 154, and/or the outer annular leg 158 away from (e.g., away from sealing contact with) the first surface 20 of the first body 14 and/or the second surface 22 of the second body 16. As such, the first and second annular lip portions 24 and 26 may relieve the pressure build up and may block or prevent trapped fluid pressure scenarios in which fluid pressure is trapped or disposed between the first and second annular lip portions 24 and 26.

As noted above, the inner portion 28 may function as the secondary seal. In particular, the inner portion 28 may provide a seal in response to fluid pressure in the event that the first annular lip portion 24 and/or the second annular lip portion 26 do not seal. Accordingly, the first and second annular lip portions 24 and 26, which may elastically deform to relieve fluid pressure between the first and second annular lip portions 24 and 26, may reduce or block fluid exposure to the inner portion 28 in the event that the first annular lip portion 24 and/or the second annular lip portion 26 does not seal.

FIGS. 4A and 4B illustrate cross-sectional views of an embodiment of the fluid system 10 including the annular radial seal 12 having the first lip portion 24 (e.g., lip ring), second lip portion 26 (e.g., lip ring), inner portion 28 (e.g., inner ring), and longitudinal axis 130, as well as first back-up ring 180 (e.g., annular back-up ring), and a second back-up ring 182 (e.g., annular back-up ring). In particular, FIG. 4A shows the annular radial seal 12 in an initial condition of installation between the first body 14 (e.g., an annular component, an inner body, a mandrel, etc.) and the second body 16 (e.g., an annular component, an outer body, a housing, etc.). FIG. 4B shows the annular radial seal 12 in an installed (e.g., sealed) condition between the first body 14 and the second body 16.

As illustrated, the first annular back-up ring 180 (e.g., back-up seal) is disposed adjacent to the first annular lip portion 24, and the second annular back-up ring 182 is disposed adjacent to the second annular lip portion 26. In particular, the first and second back-up rings 180 and 182 may be configured to abut axial ends 184 of the first pair of legs 52 and the second pair of legs 54, respectively, when the radial annular seal 12 is installed. As noted above, when the radial annular seal 12 is installed, the first and second pairs of legs 52 and 54 may be inwardly compressed (e.g., in the radial 134 direction). This inward compression may force the axial ends 184 of the first pair of legs 52 and the second pair of legs 54 against the first and second annular back-up rings 180 and 182, respectively. As such, the compressive load on the first and second annular portions 24 and 26 may be transferred to the first and second annular back-up rings 180 and 182, respectively, through the first and second pair of legs 52 and 54, respectively. Additionally, the first and second annular back-up rings 180 and 182 may transfer the pressure load to the first and second bodies 14 and 16. For example, when the first annular lip portion 24 of the seal 12 is exposed to annular fluid pressure, the compressive load may be transferred from the first annular lip portion 24 (e.g., from the first pair of legs 52) to the first body 14 and/or the second body 16 via the inner portion 28, the second annular lip portion 26, and the second annular back-up ring 182. When the second annular lip portion 26 of the seal 12 is exposed to annular fluid pressure, the compressive load may be transferred from the second annular lip portion 26 (e.g., from the second pair of legs 54) to the first body 14 and/or the second body 16 via the inner portion 28, the first annular lip portion 24, and the first annular back-up ring 180, for example. Accordingly, the first and second annular back-up rings 180 and 182 may support the first and second annular lip portions 24 and 26 and may increase the robustness of the radial annular seal 12.

The first and second annular back-up rings 180 and 182 may be formed from a third material 190, which may be any suitable robust (e.g., high strength material) configured to support and transfer the pressure loads on the first and second annular lip portions 24 and 26. In some embodiments, the ultimate compression strength of the third material 190 may between approximately 130 megapascals (MPa) and 3 gigapascals (GPa), 150 MPa and 2.7 GPa, or 170 MPa and 1 GPa. In some embodiments, the ultimate compression strength of the third material 190 may be between approximately 150 MPa and 350 MPa. In certain embodiments, the ultimate compression strength and/or the hardness of the third material 190 may be greater than the ultimate compression strength and/or the hardness, respectively, of the second material 80. In some embodiments, the third material 190 may include one or more metallic materials (e.g., metals or metal alloys), such as steel, stainless steel, nickel, chromium, iron, titanium, tungsten, platinum, zinc, cadmium, a steel-based alloy, and/or a nickel-based alloy (e.g., a nickel-iron alloy, a nickel-titanium alloy, etc.). Additionally or alternatively, the third material 190 may include one or more ceramics, such as tungsten carbide. Further, in some embodiments, the third material 190 may include one or more thermoplastic polymers (e.g., polyether ether ketone (PEEK)) and/or one or more plastics (e.g., high temperature, high strength plastics). In some embodiments, third material 190 may be corrosion resistant (e.g., including or more corrosion resistant alloys, tungsten carbide, etc.) or may include a corrosion resistant coating (e.g., polyurethane, a galvanized coating, etc.). Further, in certain embodiments, the third material 190 may be the same as the second material 80.

As illustrated, a cross-section 192 of the first annular back-up ring 180 and a cross-section 194 of the second annular back-up ring 182 may be generally rectangular. However, it should be appreciated that the cross-sections 192 and 194 may be of any other suitable geometry or shape, such as a square, a triangle, a trapezoid, an oval, a circle, an irregular shape, and so forth. In some embodiments, a generally rectangular or square cross-section may facilitate the transfer of pressure from the legs to the respective annular back-up ring.

For example, as illustrated in FIGS. 5A and 5B, the cross-sections 192 and 194 of the first and second annular back-up rings 180 and 182, respectively, may be generally triangular. FIG. 5A shows the annular radial seal 12 in an initial condition of installation between the first body 14 (e.g., an annular component, an inner body, a mandrel, etc.) and the second body 16 (e.g., an annular component, an outer body, a housing, etc.). FIG. 5B shows the annular radial seal 12 in an installed (e.g., sealed) condition between the first body 14 and the second body 16.

As illustrated, the first and second annular back-up rings 180 and 182 may each include a base 200 (e.g., a generally rectangular or square base) and a protruding portion 202 that extends (e.g., axially 132 extends) from the base 200. The protruding portion 202 may be generally triangular, V-shaped, U-shaped, or arcuate. In some embodiments, the dimensions and/or geometry of the protruding portion 202 may generally match or mirror a shape or feature of a cavity 204 formed between the annular leg 146 and the outer annular leg 150 of the first pair of legs 52 and/or between the inner annular leg 154 and the outer annular leg 158 of the second pair of legs 54. In some embodiments, the dimensions and/or geometry of the protruding portion 202 may generally match or mirror a shape or feature of inner surfaces 206 of the annular leg 146, the outer annular leg 150, inner annular leg 154, and/or the outer annular leg 158. That is, the dimensions and/or geometry of the protruding portion 202 may generally match or mirror a shape or features of the inner surfaces of each pair of legs 52 and 54.

The protruding portions 202 may support the first and second bases 30 and 32 of the first and second annular lip portions 24 and 26 when the radial annular seal 12 is installed. For example, during installation of the radial annular seal 12 between the first and second bodies 14 and 16, the inner portion 28 may axially 132 stretch, which may urge the first and second annular lip portions 24 and 26 toward the first and second annular back-up rings 180 and 182, respectively. In particular, the first and second bases 30 and 32 may be compressed against ends (e.g., axial 132 ends) 208 of the protruding portions 202, and loads from the first and second bases 30 and 32 may be transferred to the first and second annular back-up rings 180 and 182 through the protruding portions 202. As noted above, the first and second annular back-up rings 180 and 182 may transfer the pressure load to the first and second bodies 14 and 16. For example, when the first annular lip portion 24 of the seal 12 is exposed to annular fluid pressure, the compressive load may be transferred from the first annular lip portion 24 (e.g., from the first base 30) to the first body 14 and/or the second body 16 via the inner portion 28, the second annular lip portion 26, and the second annular back-up ring 182. When the second annular lip portion 26 of the seal 12 is exposed to annular fluid pressure, the compressive load may be transferred from the second annular lip portion 26 (e.g., from the second base 32) to the first body 14 and/or the second body 16 via the inner portion 28, the first annular lip portion 24, and the first annular back-up ring 180, for example. As illustrated, a gap 210 may be disposed between the axial ends 184 of the pairs of legs 52 and 54 and the base 200 of the respective annular back-up rings 180 and 182 when the radial annular seal 12 is installed. As such, loads may not be transferred through the first and second pairs of legs 52 and 54.

It should be appreciated that the radial annular seal 12 may be used with a variety of different annular back-up rings 180 and 182 having different shapes, dimensions, materials, and so forth. For example, the desired shape, dimensions, and/or materials of the back-up rings 180 and 182 may be selected based on the pressure end load of the first and second annular lip portions 24 and 26, the dimensions of the seal gland 18, and/or the deflections of the pairs of legs 52 and 54. For example, in some embodiments, the radial annular seal 12 may be suitable for use with a plurality of annular back-up rings 180 and 182 having different heights. As such, the radial annular seal 12 may be used with the annular back-up rings 180 and 182 in a plurality of seal glands 18 having different heights. For example, a desired height of the annular back-up ring 180 or 182 may be determined based on the height of the seal gland 18 and the total volume of the inner portion 28, the first annular lip portion 24, and the second annular lip portion 26.

FIGS. 6A and 6B illustrate cross-sectional views of an embodiment of the fluid system 10 including an annular face seal 12. In particular, FIG. 6A shows the annular face seal 12 in an initial condition of installation between the first surface 20 (e.g., a planar surface) of the first body 14 (e.g., an annular component, an upper body, etc.) and the second surface 22 (e.g., a planar surface) of the second body 16 (e.g., an annular component, a lower body, etc.). FIG. 6B shows the annular face seal 12 in an installed (e.g., sealed) condition between the first body 14 and the second body 16.

The annular face seal 12 includes the annular first lip portion 24 (e.g., lip ring), the annular second lip portion 26 (e.g., lip ring), the annular inner portion 28 (e.g., inner ring), and the longitudinal axis 130. Additionally, in the illustrated embodiment, the annular face seal 12 includes the first annular back-up ring 180 having the rectangular cross-section 192 and the second annular back-up ring 182 having the rectangular cross-section 194. However, the cross-sections 192 and 194 of the annular back-up rings 180 and 182, respectively, may be different (e.g., including the protruding portions 202) in certain embodiments. Further, in some embodiments, the annular face seal 12 may not include the annular back-up rings 180 and 182.

As discussed in detail above with respect to FIGS. 3A and 3B, the first annular lip portion 24, the second annular lip portion 26, and the inner portion 28 may be compressed when the annular face seal 12 is installed. However, in face seal embodiments, the inner portion 28 may be axially 132 compressed and radially 134 stretched (e.g., expanded), and the first and second lip portions 24 and 26 may be axially 134 compressed. Further, the stretch and compression of the annular inner portion 28 may urge the first and second sealing surfaces 42 and 44 of the annular inner portion 28 against the first body 14 and the second body 16, respectively, creating an axial seal 220 between the respective interfaces. Additionally, the first pair of legs 52 and the second pair of legs 54 may each create axial seals 222 with the first and second bodies 14 and 16.

Figure 7:
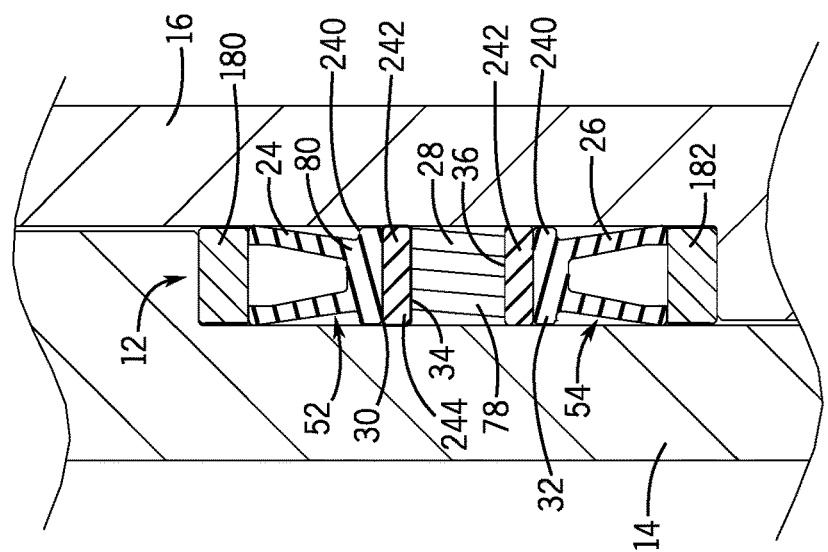
FIG. 7 is a cross-sectional view of an annular seal including an inner portion and lip seal portions formed from different materials, in accordance with an embodiment of the present disclosure.

In some embodiments, the first and second annular lip portions 24 and 26 may include different portions formed from different materials. For example, as illustrated, in FIG. 7, the first base 30 and the second base 32 may each include a first portion 240 formed from the second material 80 and a second portion 242 formed from a fourth material 244. The fourth material 244 may be different from the second material 80 and/or the first material 68.

In certain embodiments, the fourth material 244 may include a metallic material (e.g., metals or metal alloys), such as steel, stainless steel, nickel, chromium, iron, titanium, tungsten, platinum, zinc, cadmium, a steel-based alloy, and/or a nickel-based alloy (e.g., a nickel-iron alloy, a nickel-titanium alloy, etc.). Additionally or alternatively, the fourth material 244 may include one or more thermoplastic polymers (e.g., polyether ether ketone (PEEK), polytetrafluoroethylene (PTFE), etc.) and/or one or more plastics (e.g., high temperature plastics). In some embodiments, the second material 80 may include a metal or metal alloy, and the fourth material 244 may include PEEK. In certain embodiments, the second material 80 and the fourth material 244 may be different metals or metal alloys. For example, the second material 80 may include a stainless steel alloy, and the fourth material 244 may include a nickel-based alloy. In certain embodiments, the hardness of the second material 80 may be greater than the hardness of the fourth material 244.

In some embodiments, the first portions 240 of the bases 30 and 32 may be coupled to (e.g., bonded to, integral with, etc.) the pairs of legs 52 and 54, and the second portions 242 of the bases 30 and 32 may be disposed adjacent to the outer surfaces 34 and 36 of the annular inner portion 28. In certain embodiments, the second portions 242 may be adhesively and/or mechanically coupled to the inner portion 28. Further, the second portions 242 may be coupled to the first portions 250 using adhesives, welds, brazed joints, or mechanical couplers (e.g., rods, dovetail joints, screws, bolts, etc.). Further, in some embodiments, the first base 30 and the second base 32 may be formed from the fourth material 244, while the pairs of legs 52 and 54 may be formed from the second material 80.

Figure 8:
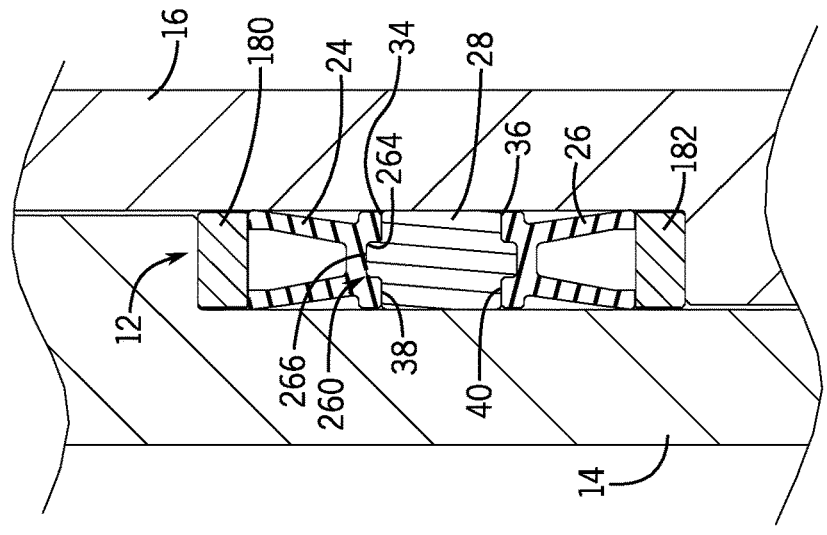
FIG. 8 is a cross-sectional view of an annular seal including lip seal portions and an inner portion that is mechanically coupled to the lip seal portions, in accordance with an embodiment of the present disclosure.

FIG. 8 illustrates a cross-sectional view of an embodiment of the annular seal 12 including an annular inner portion 28 that is mechanically coupled to the first and second annular lip portions 24 and 26. As illustrated, the annular inner portion 28 is coupled to the first annular lip portion 24 and the second annular lip portion 26 via male and female joints (e.g., dovetail joints 260). For example, the first and second outer surfaces 34 and 36 of the annular inner portion 28 may include one or more protrusions 264, and the first and second inner surfaces 38 and 40 of the first annular lip portion 24 may include one or more corresponding grooves 266. Accordingly, the dovetail joints 260 may be formed by mechanically locking the protrusions 264 and the corresponding grooves 266 (e.g., inserting the protrusions 264 into the corresponding grooves 266). It should be appreciated that in some embodiments, the first and second outer surfaces 34 and 36 may include the grooves 266, and the first and second inner surfaces 38 and 40 may include the protrusions 264. Further, in some embodiments, the first outer surface 34, the second outer surface 36, the first inner surface 38, and/or the second inner surface 40 may include a combination of protrusions 264 and grooves 266.

Figure 9:
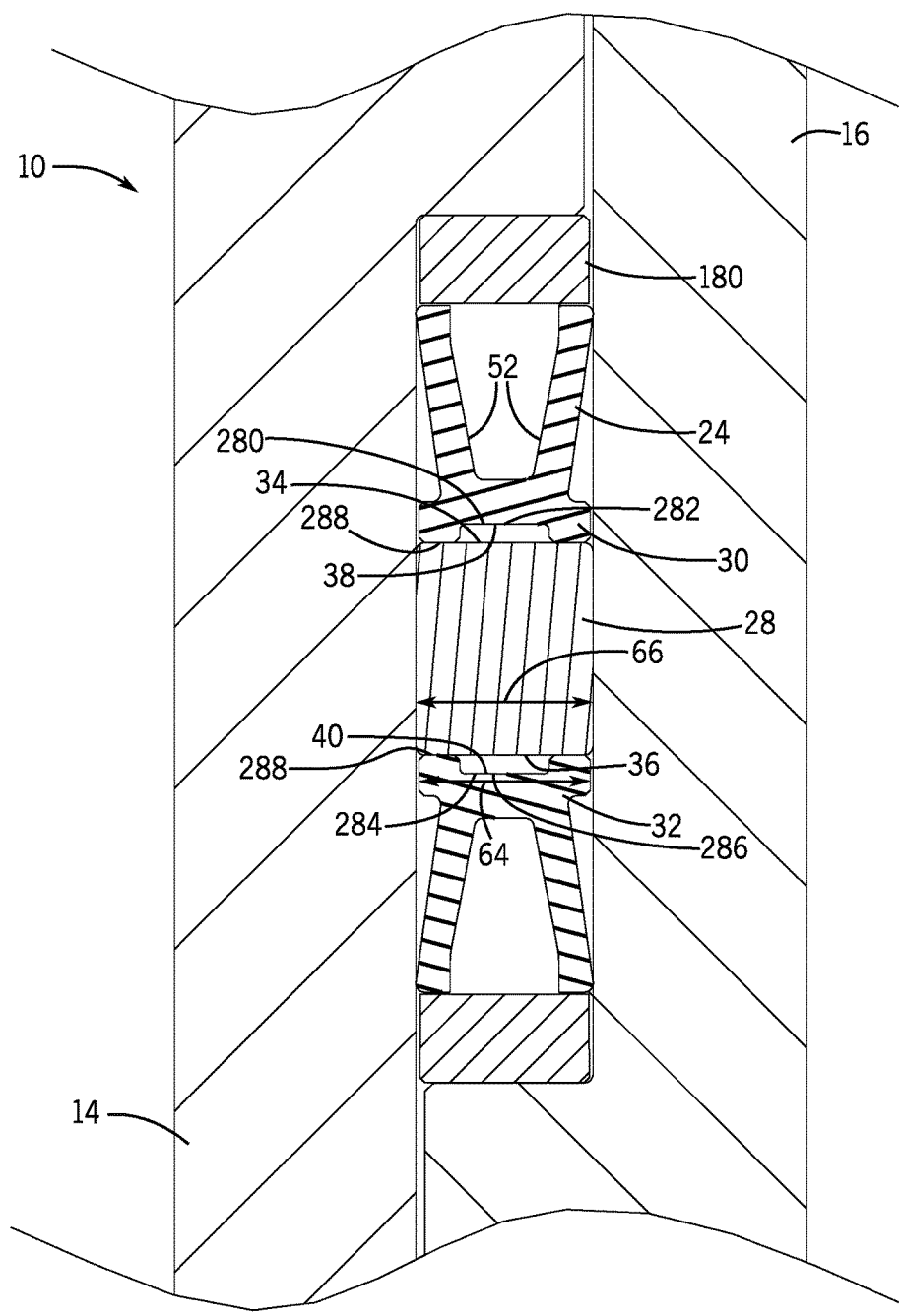
FIG. 9 is a cross-sectional view of an annular seal including an inner portion and lip seal portions having recessed bases, in accordance with an embodiment of the present disclosure.

FIG. 9 is a cross-sectional view of an embodiment of the annular seal 12 including first and second annular lip portions 24 and 26 having recessed inner surfaces 38 and 40, respectively. For example, a first recess 280 (e.g., annular recess) may be formed in a first center portion 282 of the first inner surface 38 of the first annular lip portion 24. Additionally or alternatively, a second recess 284 (e.g., annular recess) may be formed in a second center portion 286 of the second inner surface 40 of the second annular lip portion 26. As such, the first and second center portions 282 and 286 of the first and second inner surfaces 38 and 40, respectively, may not contact the first and second outer surfaces 34 and 36, respectively, of the annular inner portion 28. As illustrated, end portions 288 of the first and second inner surfaces 38 and 40 may abut portions of the first and second outer surfaces 34 and 36, respectively. Additionally, the width 64 of the first and second bases 30 and 32 may be at least 90%, 95%, or 97% of the width 66 of the seal gland 18. Thus, the first and second annular lip portions 24 and 26 having the recessed center portions 282 and 286 may still reduce or block fluid flow to the annular inner portion 28.

As discussed in detail above, the present embodiments relate to a seal (e.g., an annular seal) including first and second lip portions (e.g., annular lip portions) and an inner portion (e.g., annular inner portion) disposed between the first and second lip portions. The first and second lip portions each include a plurality of legs (e.g., a pair of legs) that extend away from the inner portion. Additionally, the pairs of legs are configured to provide the primary seal when the seal is exposed to fluid pressure. That is, the first and second lip portions are configured to reduce or block fluid flow to the inner portion, which provides a secondary seal in the event that one or both of the lip portions do not form a seal. In particular, the first and second lip portions may reduce or block fluid flow to the inner portion by reducing or minimizing a clearance gap between the first and second lip portions and the respective sealing surfaces in a seal gland. Additionally, the first and second lip portions may be formed from a different material than the inner portion. For example, the inner portion may be formed from a resilient material, such as an elastomeric material. Additionally, the first and second lip portions may be formed from a metal, a metal alloy, PEEK, or any other robust (e.g., hard, strong, corrosion resistant, low gas permeability, low coefficient of thermal expansion, etc.) material that may enable the first and second lip portions to provide a seal during exposure to harsh environmental conditions, such as extreme temperatures, extreme pressures, and/or corrosive fluids. As such, the first and second lip portions may reduce or minimize the possibility of damage to the inner portion that may potentially occur in the event that the inner portion is exposed to fluids (e.g., corrosive fluids, abrasive fluids, fluids at extreme temperatures and/or pressures, etc.). Additionally, by reducing or minimizing the clearance gap, the first and second lip portions may block the inner portion from deforming, extruding, and/or extending past the inner surfaces of the first and second lip portions and toward the pairs of legs. As such, the first and second lip portions may reduce or minimize the possibility of extrusion of the inner portion and may reduce or minimize damage to the inner portion in the event that extrusion occurs. Thus, the first and second lip portions may reduce damage to the seal and may increase the sealing ability, robustness, and lifespan of the seal.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

Although the present disclosure has been described with respect to specific details, it is not intended that such details should be regarded as limitations on the scope of the invention, except to the extent that they are included in the accompanying claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for sealing together a first body having a first sealing surface and a second body having a second sealing surface, comprising:
a first annular lip portion comprising a first base and a first pair of legs extending from the first base, wherein the first pair of legs when in operation contacts and seals against the first and second sealing surfaces of the respective first and second bodies, and the first base has a first pair of protruding portions that protrude outwardly from the respective first pair of legs toward the first and second sealing surfaces to define a first width, and a first pair of fluid chambers is disposed between the respective first pair of protruding portions of the first base and the respective first pair of legs;
a second annular lip portion comprising a second base and a second pair of legs extending from the second base, wherein the second pair of legs when in operation contacts and seals against the first and second sealing surfaces of the respective first and second bodies, the second base has a second pair of protruding portions that protrude outwardly from the respective second pair of legs toward the first and second sealing surfaces to define a second width, a second pair of fluid chambers is disposed between the respective second pair of protruding portions of the second base and the respective second pair of legs, and wherein the first pair of legs and the second pair of legs extend away from each other; and
an inner annular portion disposed entirely between the first base and the second base;
wherein the first width of the first base and the second width of the second base are each between 90% to 100% of a distance between the first and second sealing surfaces of the respective first and second bodies;
wherein the first annular lip portion, the second annular lip portion, or both when in operation are exposed to a fluid under pressure between the first and second sealing surfaces of the respective first and second bodies;
wherein the first pair of protruding portions of the first base and the second pair of protruding portions of the second base when in operation reduce exposure of the fluid to the inner annular portion;
wherein at least one leg of the first and second pairs of legs when in operation moves away from the first or second sealing surface to relieve a pressure buildup of the fluid in at least one chamber of the first and second pairs of fluid chambers to protect the inner annular portion; and wherein the inner annular portion is formed from a first material that contacts the first and second bases and, when in operation, contacts the first and second sealing surfaces, wherein the first annular lip portion, the second annular lip portion, or both are formed from a second material different from the first material.

2. The system of claim 1, wherein a hardness of the first material is less than a hardness of the second material, a coefficient of thermal expansion of the first material is greater than a coefficient of thermal expansion of the second material, a gas permeability of the first material is greater than a gas permeability of the second material, an elasticity of the first material is greater than an elasticity of the second material, or a combination thereof.

3. The system of claim 1, wherein the first material comprises an elastomer that contacts the first and second bases and, when in operation, the first and second sealing surfaces, and the second material comprises a metal, polyether ether ketone (PEEK), or both.

4. The system of claim 1, wherein the first base has a first rectangular cross-section with opposite first and second sides extending straight along a central axis, the second base has a second rectangular cross-section with opposite third and fourth sides extending straight along the central axis, the first and third sides are configured to extend straight along the first sealing surface, and the second and fourth sides are configured to extend straight along the second sealing surface.

5. The system of claim 1, wherein the first pair of legs and the second pair of legs when in operation elastically deform to seal against the first and second sealing surfaces of the respective first and second bodies, and the first base and the second base when in operation block extrusion of the inner annular portion.

6. The system of claim 1, wherein the first width of the first base and the second width of the second base are each equal to or greater than 95% of the distance between the first and second sealing surfaces of the respective first and second bodies.

7. The system of claim 1, wherein the first width of the first base and the second width of the second base are each equal to or greater than 97% of the distance between the first and second sealing surfaces of the respective first and second bodies.

8. The system of claim 1, wherein the first and second pairs of legs each comprise a first leg configured to seal against the first sealing surface and a second leg configured to seal against the second sealing surface, and wherein each first leg and each second leg when in operation elastically deforms out of sealing contact with the respective first or second sealing surface of the first or second body in response to the pressure buildup of the fluid applied to outer surfaces of the first and second legs while the first and/or second annular lip portion is exposed to the fluid under pressure.

9. A system for sealing together a first body having a first sealing surface and a second body having a second sealing surface, comprising:

first and second metal lip rings, each metal lip ring comprising a base and first and second legs extending from the base, wherein the base has first and second protruding portions that protrude outwardly from the respective first and second legs toward the first and second sealing surfaces, the first leg when in operation elastically deforms to contact and seal against the first sealing surface, and the second leg when in operation elastically deforms to contact and seal against the second sealing surface; and an elastomer ring disposed entirely between the bases of the first and second metal lip rings, wherein the elastomer ring has a first elastomer sealing surface configured to seal against the first sealing surface and a second elastomer sealing surface configured to seal against the second sealing surface, and the first and second elastomer sealing surfaces extend at least half of a first distance between the bases of the respective first and second metal lip rings;

wherein the first and second legs of each metal lip ring extend away from the elastomer ring; and wherein the first metal lip ring, the second metal lip ring, or both when in operation are exposed to a fluid between the first and second sealing surfaces of the respective first and second bodies, and wherein the first and second protruding portions of the bases of the first metal lip ring and the second metal lip ring when in operation reduce exposure of the fluid to the elastomer ring.

10. The system of claim 9, wherein the first and second legs of each metal lip ring when in operation elastically deform out of sealing contact with the respective first and second sealing surfaces of the first and second bodies in response to fluid pressure applied to outer surfaces of the first and second legs, and the bases of the first metal lip ring and the second metal lip ring when in operation block extrusion of the elastomer ring.

11. The system of claim 9, wherein the elastomer ring has a first elastomer surface disposed directly against the base of the first metal lip ring and a second elastomer surface disposed directly against the base of the second metal lip ring.

12. The system of claim 9, wherein a width of each base is equal to or greater than 90% of a second distance between the first and second sealing surfaces of the respective first and second bodies.

13. The system of claim 9, further comprising first and second back-up rings, wherein the first back-up ring is adjacent to the first metal lip ring and the second back-up ring is adjacent to the second metal lip ring, wherein the first back-up ring when in operation transfers a first fluid pressure load from the second metal lip ring to the first body, and wherein the second back-up ring when in operation transfers a second fluid pressure load from the first metal lip ring to the first body.

14. The system of claim 13, wherein each of the first and second back-up rings when in operation contacts only distal ends of the respective first and second legs without contacting inner surfaces of the respective first and second legs.

15. The system of claim 13, wherein each of the first and second back-up rings extends into a space between the first and second legs and contacts inner surfaces of the respective first and second legs.

16. The system of claim 9, wherein each base of the first and second metal lip rings has opposite first and second sides extending straight along a central axis, the first side is configured to extend straight along the first sealing surface, and the second side is configured to extend straight along the second sealing surface.

17. An annular seal disposed within a seal gland formed between a first body and a second body, comprising:

first and second lip rings each including a base and first and second legs extending from the base, wherein the base has first and second protruding portions that protrude outwardly from the respective first and second legs toward first and second sealing surfaces of the respective first and second bodies, the first leg when in operation elastically deforms to contact and seal against the first body, and the second leg when in operation elastically deforms to contact and seal against the second body; and an elastomer ring disposed entirely between the bases of the first and second lip rings, wherein the elastomer ring when in operation seals against the first sealing surface of the first body and the second sealing surface of the second body, and the elastomer ring has a first elastomer surface disposed against the base of the first lip ring and a second elastomer surface disposed against the base of the second lip ring;

wherein the first and second legs of each lip ring of the first and second lip rings extend away from the elastomer ring, and wherein the first and second protruding portions of the bases of the first lip ring and the second lip ring when in operation block extrusion of the elastomer ring.

18. The annular seal of claim 17, wherein a width of each base is equal to or greater than 90% of a distance between the first and second sealing surfaces of the respective first and second bodies.

19. The annular seal of claim 17, wherein each of the first and second lip rings has first and second fluid chambers disposed between the respective first and second protruding portions of the base and the respective first and second legs, and at least one of the first or second legs of the first or second lip rings when in operation moves away from the first or second sealing surface to relieve a pressure buildup of the fluid in at least one of the first or second fluid chambers of the first or second lip rings to protect the elastomer ring while the annular seal is exposed to a fluid under a pressure in the seal gland.

20. The system of claim 9, wherein the elastomer ring has opposite first and second sides extending straight along a central axis to the base of each of the first and second metal lip rings, and the first and second elastomer sealing surfaces extend along substantially the entire first distance between the bases of the respective first and second metal lip rings.

21. The system of claim 20, wherein the elastomer ring has a rectangular cross-section having the first and second sides, and the elastomer ring has a first elastomer surface disposed against the base of the first metal lip ring and a second elastomer surface disposed against the base of the second metal lip ring.

22. The system of claim 9, wherein each base of the first and second metal lip rings has a groove that is open toward the elastomer ring, and an elastomeric material of the elastomer ring extends into the groove in each base of the first and second metal lip rings.

23. A system for sealing together a first body having a first sealing surface and a second body having a second sealing surface, comprising:

an elastomer portion;

a first metal portion having a first base disposed adjacent the elastomer portion and a first pair of legs extending away from the first base and the elastomer portion; and a second metal portion having a second base disposed adjacent the elastomer portion and a second pair of legs extending away from the second base and the elastomer portion;

wherein the elastomer portion is disposed entirely between and directly abuts the first and second bases of the respective first and second metal portions;

wherein a width of each of the first and second bases is equal to or greater than 90% of a distance between the first and second sealing surfaces of the respective first and second bodies.

* * * * *